United States Patent [19]

Abramovich

[11] Patent Number: 4,488,303
[45] Date of Patent: Dec. 11, 1984

[54] FAIL-SAFE CIRCUIT FOR A MICROCOMPUTER BASED SYSTEM

[75] Inventor: Abe Abramovich, Lawrenceville, N.J.

[73] Assignee: RCA Corporation, New York, N.Y.

[21] Appl. No.: 379,096

[22] Filed: May 17, 1982

[51] Int. Cl.³ .............................................. H03K 17/00
[52] U.S. Cl. ......................................... 371/62; 371/12
[58] Field of Search ............................. 371/12, 14, 62

[56] References Cited

U.S. PATENT DOCUMENTS

| | | | |
|---|---|---|---|
| 3,876,987 | 4/1975 | Dalton et al. | 364/200 |
| 3,882,455 | 5/1975 | Heck et al. | 364/200 |
| 3,991,406 | 11/1976 | Downing et al. | 364/200 |
| 3,991,407 | 11/1976 | Jordan, Jr. et al. | 364/200 |
| 4,023,109 | 5/1977 | Shreve | 371/62 |
| 4,112,488 | 9/1978 | Smith | 364/200 |
| 4,141,066 | 2/1979 | Keiles | 364/200 |
| 4,210,226 | 7/1980 | Ichioka | 371/62 |
| 4,392,226 | 7/1983 | Cook | 371/62 |
| 4,405,982 | 9/1983 | Ruhnau et al. | 371/62 |

Primary Examiner—Jerry Smith
Assistant Examiner—M. Ungerman
Attorney, Agent, or Firm—Joseph S. Tripoli

[57] ABSTRACT

A fail-safe protection circuit for a data processor controlled system having a data bus for carrying data and comprising first logic for checking the operation of the data processor controlled system at periodic intervals not greater than $T_1$ and for producing a trigger pulse at each check if the data processor is operating properly, second logic for detecting the absence of trigger pulses for a time period $T_2$ to produce a control signal. Gating logic is responsive to the control signal to prevent the transmission of data through the data bus and a control circuit is also responsive to the control signal to reset the system to a predetermined operating state. The first logic responds to the resetting of the system to again produce the periodic trigger pulses if the system is operating properly.

9 Claims, 5 Drawing Figures

FAIL-SAFE CIRCUIT FOR A MICROCOMPUTER BASED SYSTEM

This invention relates generally to failure-responsive protection circuits and more particularly, to a fail-safe protection circuit for a microcomputer based control system.

In many applications, a computer, usually a microcomputer, based control system requires a level of protection which will ensure that when a malfunction occurs, either in the hardware or in the software, the controlled system will revert to a predetermined state. One example of such a requirement occurs in energy management systems in which a network of microcomputers are employed to control the heating, ventilation, and air conditioning systems in one or more buildings. In the event of a serious hardware or software failure in the system, it is imperative that the system return to a predetermined back-up mode of operation to ensure the continued comfort and safety of the building's occupants.

There are many prior art systems which respond to the failure of the processing system to circumvent the trouble and re-establish proper operation. Some of these systems involve redundant components or control circuitry which will re-arrange the components to by-pass the problem. Others involve error correcting logic which examine the instructions and data words to detect and correct one or two errors therein and thus maintain correct operation of the system. Still others simply shut down the system in response to certain type errors and await correction by a human operator. Most of these systems require considerable logic, particularly those utilizing redundancies or realignment of the various components of the system.

In the present invention, relatively simple fail-safe logic is employed to continuously monitor the successful operation of the system and to permit the flow of data therein. The fail-safe logic responds to a failure of the system to prevent further flow of erroneous data or instructions, and to reinitiate operation of the system to a known state and to energize an alarm.

In accordance with one form of the invention there is provided a fail-safe protection circuit for a data processor controlled system having a plurality of data output terminals and logic responsive to continued proper operation of the system to generate trigger pulses, indicating such proper operation, at periodic intervals not greater than $T_1$. A first retriggerable, two-state one-shot device is responsive to each trigger pulse to become triggered, or retriggered, to its first state for a time period $T_2$ before changing from such first state back to its second state, where $T_2 > T_1$. Also provided is a plurality of gates each having a first input terminal connected to one of the data output terminals, a second input terminal and a second output terminal. The gates are responsive to the first state of the first retriggerable two-state one-shot device to become primed to conduct therethrough the data supplied to the first input terminals and responsive to the second state of the first retriggerable, two-state, one-shot device to inhibit the passage therethrough of the data supplied to the first input terminals thereof. A second retriggerable two-state one-shot device is responsive to the change from its first to its second state of the first retriggerable device to re-initiate or reset the operation of the data processor. Other logic is responsive to continued absence of trigger pulses to set the controlled system to a predetermined operating state.

IN THE DRAWINGS

Figure 2:
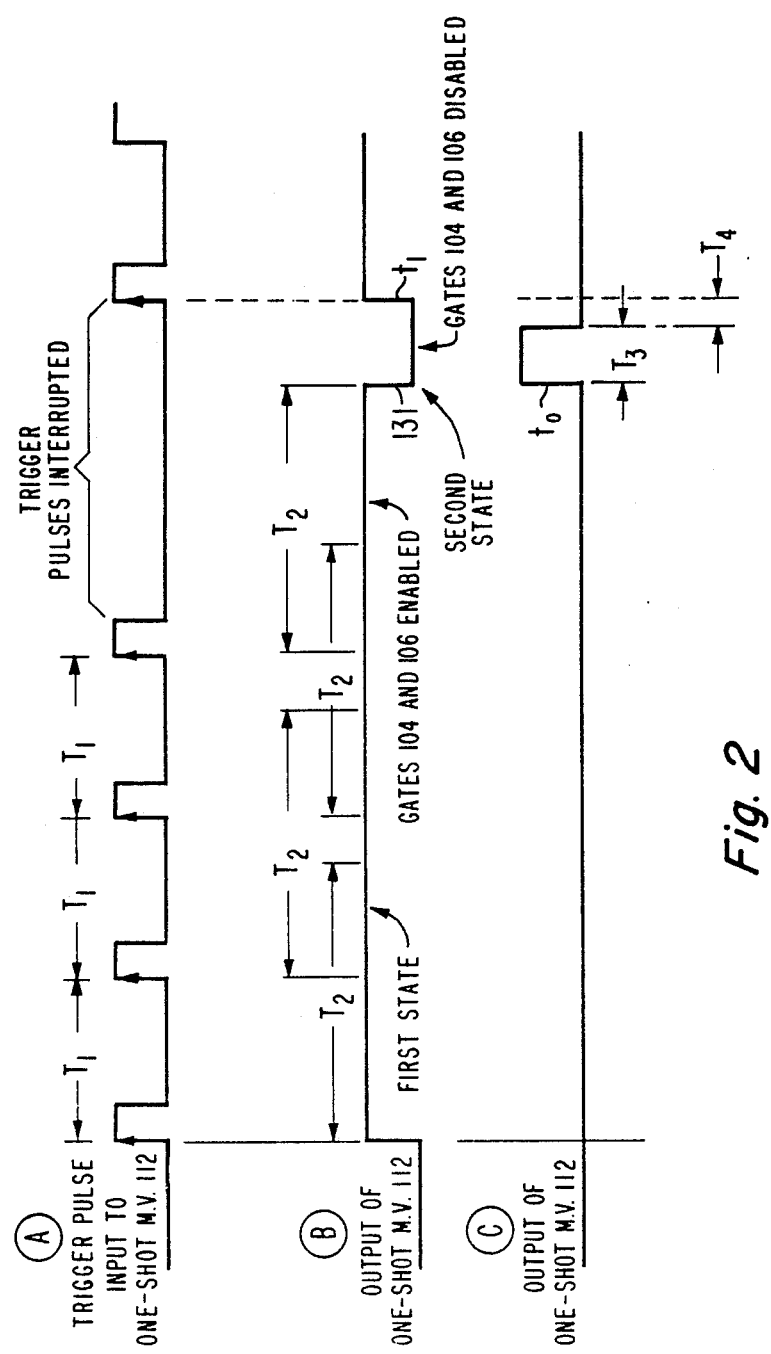
FIG. 2 is a set of waveforms to facilitate an understanding of FIG. 1.
Figure 4:
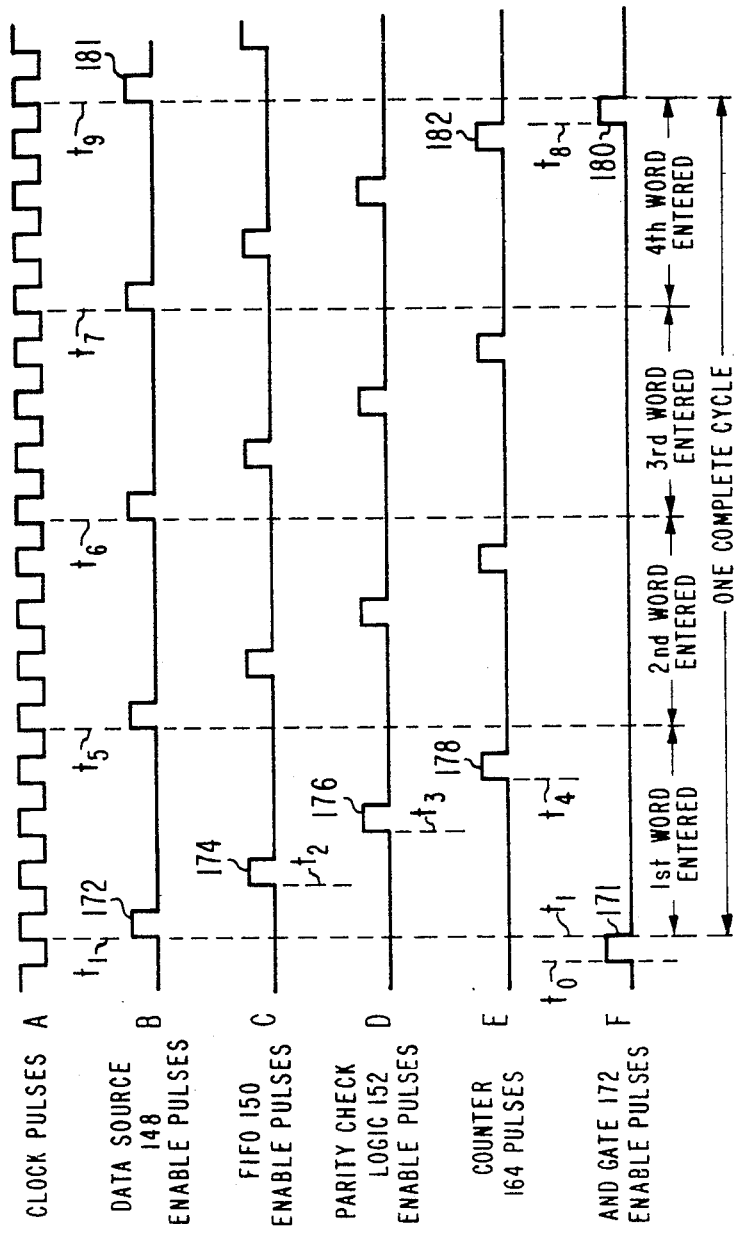
FIG. 4 is a set of timing waveforms to facilitate an understanding of FIG. 3.

For purposes of brevity, the waveforms of FIGS. 2 and 4 will be referred to herein as waveform 2A, waveform 2B, waveform 4A, etc. rather than as waveform A of FIG. 2 or waveform A of FIG. 4.

Figure 1:
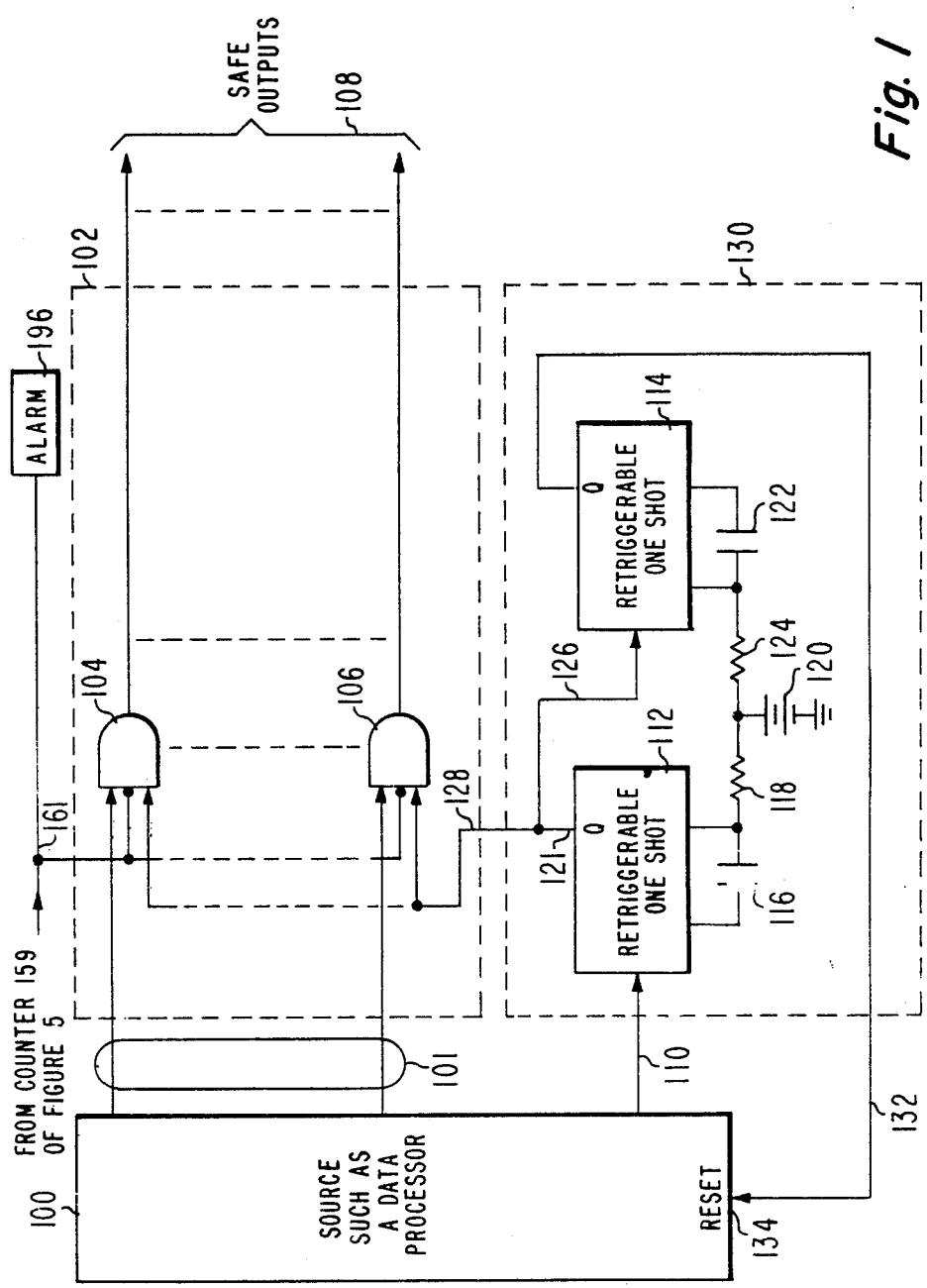
FIG. 1 is a combination logic and schematic diagram of one form of the invention.

Referring now to FIG. 1 there is shown data source 100 which can consist entirely of hardware or can be a microprocessor under control of a program. In either event, data is outputted from some source therein (such as data word source 148, a first in-first out (FIFO) unit of FIG. 3, to be described later herein) to a buffer 102 consisting of a plurality of AND gates such as AND gates 104 and 106 which, when enabled will supply data words from the source 100 to the output terminals 108 and thence to a peripheral device or some other destination in the system.

The source 100 must be able to generate a series of trigger pulses on output lead 110 which are separated by not more than a given time period $T_1$ as shown in waveform A of FIG. 2 and which can be generated by the logic of FIG. 3, to be described later herein. Such trigger pulses indicate continued successful operation of the system. In an energy management application the trigger pulses of waveform A might represent the successful transmission of data to or from a peripheral device such as a fan, an air conditioning unit, a heating unit, etc. and which, in such a system, will occur several times a second. The successful transmission or reception of data can be determined by checking certain predetermined parameters of the data words as will be discussed in more detail in connection with the logic diagram of FIG. 3.

The aforementioned trigger pulses are supplied via output lead 110 to the input of a retriggerable one-shot multivibrator 112 which is constructed to remain in its triggered condition for a time period which is greater than $T_1$. Thus, as long as trigger pulses continue to be produced by source 100, the retriggerable one-shot multivibrator 112 will remain in its first state so that a high level signal will appear on its output terminal 121 and will be supplied via lead 128 to inputs of AND gates of buffer 102 such as AND gates 104 and 106 and to the input terminal of a second retriggerable one-shot multivibrator 114 via lead 126.

AND gates 104 and 106 will be primed by such high level signal so as to conduct therethrough data supplied from the source 100 to output terminals 108 and which is defined herein as safe data output, i.e., correct data.

If, however, the train of trigger pulses appearing on lead 110 should fail for a time period greater than the time period $T_2$, which is greater than time period $T_1$ and which is the time period of retriggerable one-shot 112 as determined by capacitor 116, resistor 118, and battery source 120, then the one-shot multivibrator 112 will switch from its first, high level state to its second state, or low level state, so that the signal on output terminal 121 thereof will be a low level signal. The one-shot multivibrator 112 will remain in its second, low level state indefinitely until periodic trigger pulses again reoccur on lead 110 of FIG. 1.

The negative going edge 131 of waveform 2B which is generated at the output terminal 121 of multivibrator 112 when the multivibrator 112 switches from its first state back to its second state, will trigger the second one-shot multivibrator 114 to its first, high level state, as shown in waveform 2C. Such high level state will be supplied back to the reset input terminal 134 of source 100 to reset source 100 to a predetermined state after a short time interval $T_3$.

The resetting of source 100 in many applications will basically mean resetting or re-running a control program. If it re-runs properly the system operation will continue.

Specifically, unless the failure is a major one the trigger pulses will again be generated in source 100 and supplied to one-shot multivibrator 112 to cause multivibrator 112 to assume its first state as shown at time $t_1$ in waveform 2B. If the failure persists then it might be desirable to place the system in a predetermined operating state. In the case of an energy management application such predetermined operating state might mean that the air ducts are open, the blower motor is running, and in the wintertime, the heat is on.

Figure 5:
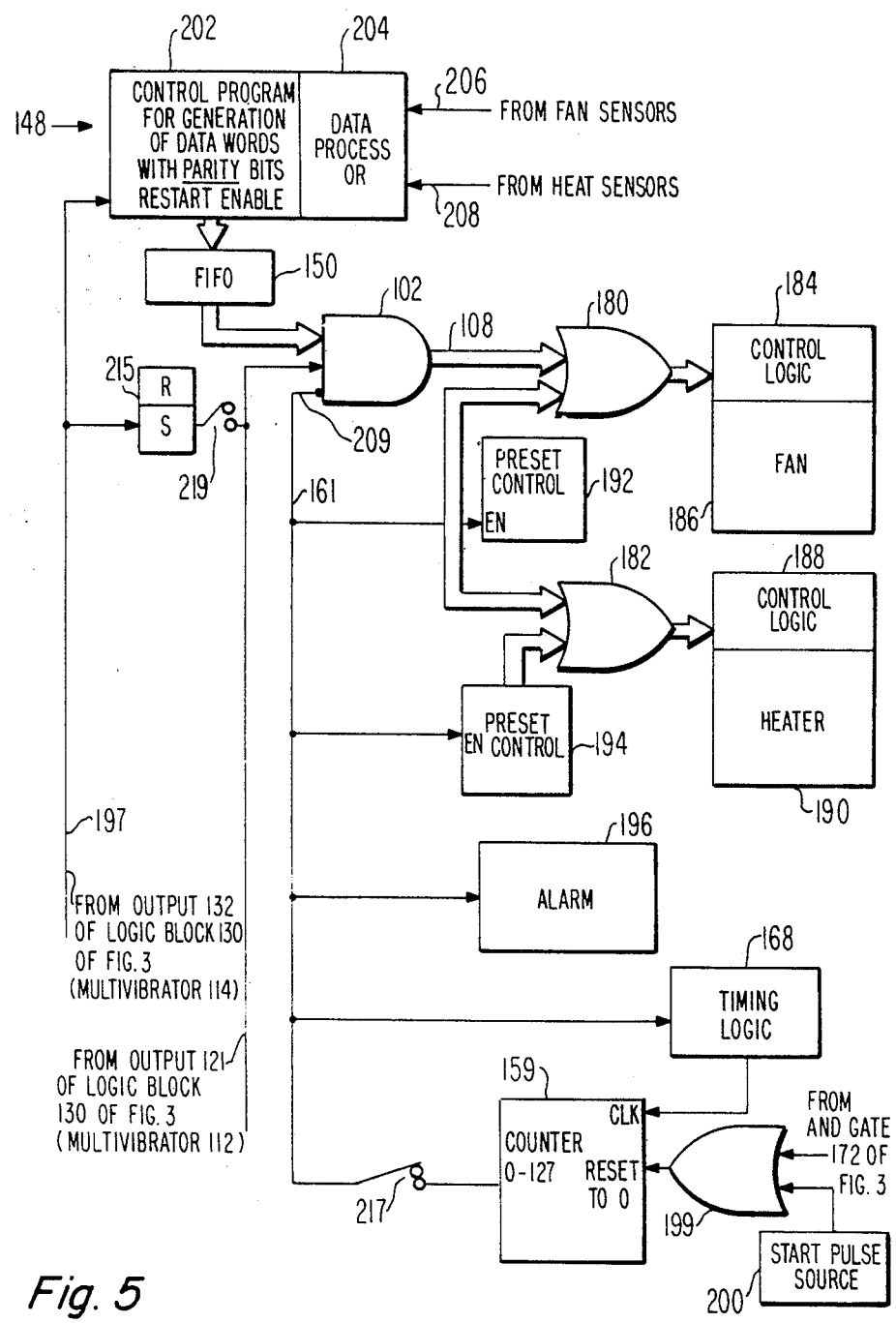
FIG. 5 is a logic diagram supplementing the logic diagram of FIG. 1 and showing logic specific to an energy management system.

Logic for effecting such a predetermined operating state is shown in FIG. 5 which will be discussed later herein. Also, with the logic of FIG. 5, with slight modification, the system can be placed in a predetermined operating state upon the first failure thereof, i.e., when the failure time exceeds $T_2$.

Further, in an energy management application, an appropriate length of time that the one-shot multivibrator 112 will remain in its low level state due to the absence of trigger pulses being supplied thereto is about 30 seconds. It is apparent that for other applications the time intervals $T_1$, $T_2$ and $T_3$ discussed herein can be quite different. During the time interval that the one-shot multivibrator 112 is in its low level state the AND gates 104 and 106 are disabled so that no data passes therethrough from source 100 to the output terminals via (bus) 108.

When data source 100 is reset by the output from one-shot multivibrator 114 via lead 132, the system might or might not begin to operate properly depending upon the nature of the error. If it does operate properly, then a series of trigger pulses will again be supplied to the one-shot multivibrator 112 via lead 110 and will cause the retriggerable one-shot multi-vibrator 112 to switch back to its first high level state, and remain so for as long as a time the train of trigger pulses continues to be supplied thereto.

On the other hand, if after being reset, the source 100 still does not function properly, there will be no train of trigger pulses supplied to the one-shot multivibrator 112 which will consequently remain in its low level state to disable AND gates 104 and 106. As mentioned above, in the case of an energy management application, if the absence of trigger pulses persists for a predetermined time the logic of FIG. 5, to be described later herein, will respond thereto to reset the system to a predetermined operating state.

Figure 3:
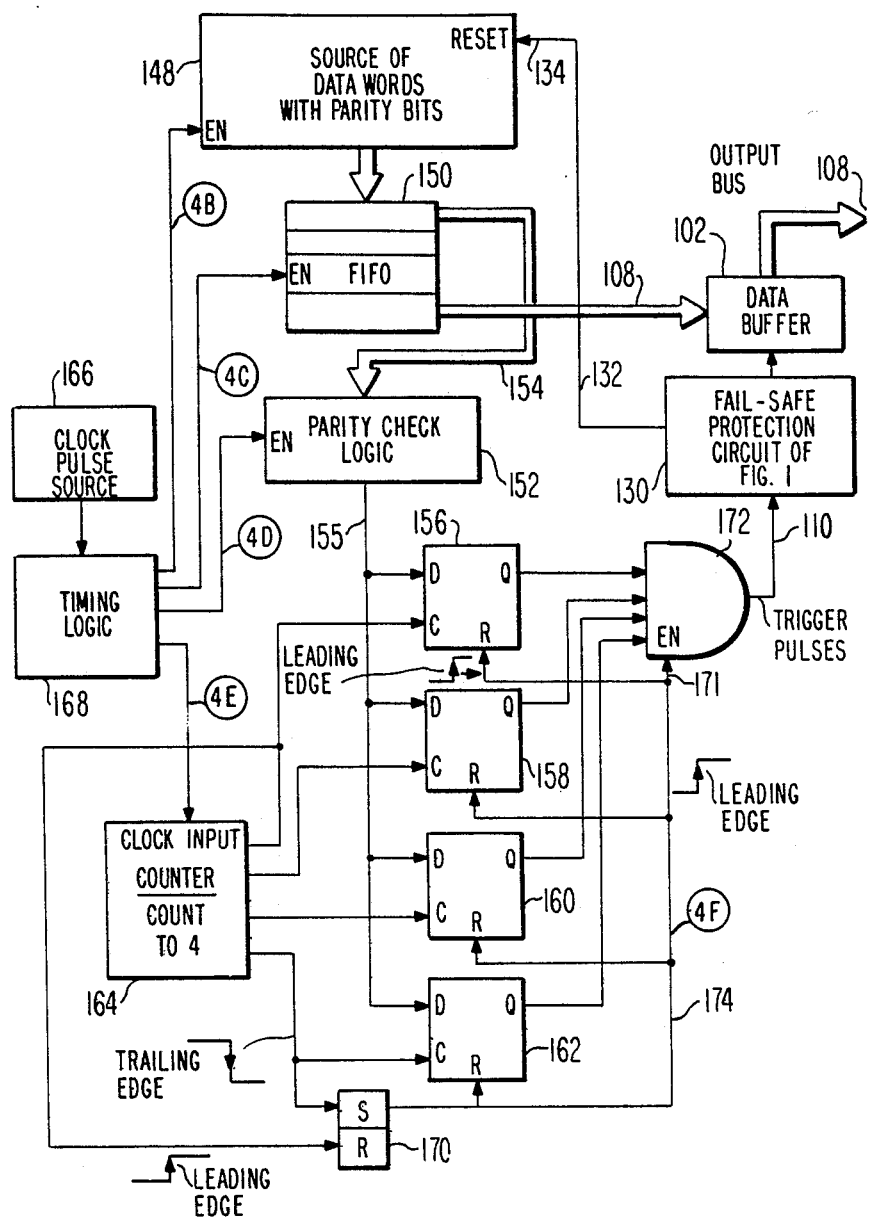
FIG. 3 is a block diagram of the invention showing in more detail logic for generating the required trigger pulses.

Referring now to FIG. 3, there is shown a form of the invention which includes a block diagram of one suitable logic arrangement for generating trigger pulses when the system is operating properly and terminating such trigger pulses when the system is operating improperly.

In FIG. 3, the block 130 labelled FAIL-SAFE PROTECTION CIRCUIT OF FIG. 1 corresponds to the logic within the dashed line block 130 of FIG. 1 and the block 102 labelled DATA BUFFER corresponds to the logic within the dashed line block 102 of FIG. 1. The lead 110 and the bus 108 of FIG. 3 correspond to lead 110 and bus 108 of FIG. 1.

A source of data words 148 can be any one of many source of data words such as a data processor or a peripheral device. Such data words are supplied in sequence to FIFO buffer storage unit 150. The FIFO unit 150 can have any suitable member of stages. In the example shown, the FIFO unit is represented as having four word storage levels. As each data word is entered into FIFO 150, it is supplied to a parity check logic 152 via bus 154. If the parity is correct, a binary high logic level signal is supplied to output lead 115 which is connected to the data inputs of the four D-type flip-flop circuits 156, 158, 160 and 162. The proper timing of the supplying of each data word from source 148 to FIFO 150 and the result of the parity check thereof in logic 152 is under control of timing logic 168 and basic clock pulse source 166. The enabling pulses generated in timing logic 168 and supplied to the enable inputs of source of data words 148, FIFO unit 150 and parity check logic 152 are shown in timing waveforms 4B, 4C and 4D, respectively. The clock enabling clock pulses for counter 164 are shown in waveform 4E.

The counter 164 functions to enable flip-flop circuits 156, 158, 160 and 162 in successive order and then to become reset to a count of one and repeat the cycle. At each count of four, the counter 164 will set flip-flop 170 to provide an enabling pulse to the enable input 171 of AND gate 172, thereby providing a trigger pulse on output lead 110 thereof only if all of the four inputs to AND gate 172 are high level signals. Such input signals will be high level signals only if the Q outputs of each of the four flip-flops 156, 158, 160 and 162 are at a high level indicating that the parity check of the previous four words, as represented by the contents of the four flip-flops 156, 158, 160 and 162, are all high levels i.e., the parity checks indicate that the word is a proper word.

If any of the parity checks of the four words being checked are at a low level, indicating an improper word, one of the inputs to AND gate 172 will be at a low level, so that AND gate 172 will not produce a trigger pulse on output terminal 110 thereof. If such a condition exists over a predetermined number of trigger pulse periods then the fail-safe protection circuit 130 will be activated as discussed above re FIG. 1.

As can be seen from FIG. 3, the data words supplied from data source 148 are examined for parity in groups of four words. More specifically, when four new words have been supplied to FIFO unit 150, parity checks are made thereon, and the results of such parity checks are entered successively into the four flip-flops 156–162 by means of the timing pulses supplied from counter 164. Such parity checks will be simultaneously examined by AND gate 172 which is enabled by the set enabling output pulse from flip-flop 170. Such set enabling pulse is shown in waveform 4F as pulse 180 and is initiated by the trailing edge of the count-of-four pulse 182 of waveform 4E from counter 164 and is terminated by the leading edge of the count-of-one output pulse 181 of waveform 4B.

The enabling pulses for the entry into flip-flops 156, 158, 160, and 162 of each of the four words of each group of four words is shown in the timing diagrams of FIG. 4. More specifically, the first word parity check is entered into flip-flop 156 as shown in time interval $t_1$–$t_5$ of FIG. 4. The four enabling pulses 172, 174, 176 and 178 of waveforms 4B, 4C, 4D and 4E represent the enabling pulses supplied respectively to data word source 148, FIFO 150, parity check logic 152, and counter 164. Second, third, and fourth words are entered in similar manner by similar enabling pulses shown within the time intervals $t_5$–$s_6$, $t_6$–$t_7$ and $t_7$–$t_9$. As discussed above, at the end of the entry of the four words into the flip-flops 156, 158, 160 and 162, the enabling pulse 180 of waveform 4F is generated to check the composite parity of the group of four words by means of AND gate 172. If all four words have parity a trigger pulse is produced from gate 172 upon the occurrence of the leading edge of pulse 180.

As long as the train of trigger pulses on output lead 110 of AND gate 172 continues without interruption the output of the fail-safe detection circuit 130 will enable the data buffer 102 to supply the output of the last stage 131 of FIFO 150 therethrough and to the output bus 108.

As discussed above, if the trigger pulses should fail for period greater than $T_2$ then the two one-shot multivibrators 112 and 114 of FIG. 1 are activated, as shown in waveforms 2B and 2C, to supply a reset pulse to data source 100 via lead 132.

Further, as discussed briefly above, in certain applications, such as an energy management situation, if the failure persists it is frequently desired to set the system being controlled, such as the fan, the heater, and the air conditioning of an energy management situation, to certain predetermined states, such as the fan running and the heater being on in the wintertime. In such applications, the logic of FIG. 5 can be employed. In FIG. 5 an initial failure can result in the restarting of a control program 202 of a data processing system 204 by the output of the retriggerable one-shot multivibrator 114 of FIG. 1. If the failure persists after such restarting, then counter 159 will be permitted to count through its count capacity to a count of 127 at which time a high level signal will appear on its output lead 161. Such high level signal will disable buffer gate 102, which corresponds to buffer gate 102 of FIG. 1, thereby preventing the flow of information from FIFO 150 into the control logic 184 and 188 of fan 186 and heater 190 through OR gates 180 and 182, which would normally occur if the system were operating correctly.

Also, the high level signal from counter 159 will enable the pre-set control logic 192 and 194 which will then supply pre-set control signals to fan 186 and heater 190 to set them to some predetermined operating state. The alarm 196 will also be enabled to warn an operator that a persistent failure has occurred.

It is apparent that when buffer AND gate 102 is disabled the sensor signals received by data processor 204 from fan and heater sensors via leads 206 and 208 have no effect on the operation of the fan 186 and the heater 190.

During normal operation the counter 159 is reset to 0 at every output of the gate 172 of FIG. 3 so that as long as the trigger pulses continue the counter 159 cannot count to its capacity. Once reaching the count of 127, the counter 159 will remain there until a start pulse is supplied thereto through OR gate 199 from start pulse source 200.

If it is desired to place the fan 186 and heater 190 in a predetermined operating state when the trigger pulses fail for a period greater than $T_2$, i.e., when multivibrator is activated to its first state at time $t_0$ in waveform 2C, then lead 197 of FIG. 5 should be connected to inhibit input 209 of buffer gate 102. To accomplish such a function a flip-flop 215 and switches 219 and 217 can be provided. By closing switch 219 and opening switch 217, the counter 159 will be removed from the circuit and flip-flop 215 will be set by multivibrator 114. The setting of flip-flop 215 will place fan 186 and heater 190 in a predetermined operating state under control of logic 192 and 194.

The operation of the conventional four D-type flip-flops 156, 158, 160 and 162 is well known. A low or high level signal supplied to an input data input terminal D is clocked to the output terminal Q when a clock pulse is supplied to the clock input C from counter 164.

While a block diagram of logic which can produce a desired train of trigger pulses is shown in FIG. 3, it is to be understood that the generation of such trigger pulses can be accomplished by a microprocessor which is properly programmed to examine data words, and other functional characteristics of the system periodically to determine if the system is operating properly. Tests other than parity checks can be made. Almost any microprocessor of any degree of sophistication can be easily programmed by one of ordinary skill in the art to check supervisory and application programs being executed at periodic intervals to determine if the operation is proper. Basically, such periodic checks can be made with service sub-routines which are called forth periodically to check the predetermined parameters of operation or the characteristics of the data words which indicate proper or improper operation of the system or of the programs.

What is claimed is:

1. A fail-safe protection circuit for a data processing controlled system having stored programs, a plurality of data output terminals, and a first output terminal and comprising:

means for checking the execution of its programs at periodic intervals not greater than $T_1$ to produce an output trigger pulse on said first output terminal at said periodic intervals if said program execution is correct up to that time, and comprising:

a first retriggerable two-state one-shot device responsive to said output pulses to become triggered to its first state and having a time delay $T_2$ before it changes from its triggered first state to its second state, where $T_2 > T_1$;

a plurality of gating means each having a first input terminal connected to an individual one of said data output terminals, a second input terminal coupled to the said first retriggerable two-state, one-shot device, and a second output terminal; and said gating means responsive to the first state of said first retriggerable, two-state, one-shot device to become primed to pass therethough the data supplied to said first input terminal and responsive to the second state of said first retriggerable, two-state, one-shot device to inhibit the passage therethrough of the data supplied to said first input terminal thereof.

2. A circuit as in claim 1 and further comprising:
a second retriggerable two-state, one-shot device responsive to the change from the first to the second state of said first retriggerable device to produce a second output signal;
said data processing controlled system responsive to said second output signal to re-initiate its operation.

3. A circuit as in claim 2 in which said data processing controlled system comprises controlled devices and further comprising logic means responsive to the absence of N consecutive output trigger pulses to disable said data processing controlled system and to place said controlled devices in predetermined operating states.

4. A circuit as in claim 1 and further comprising:
a signal generating means responsive to the change from the first to the second state of said first retriggerable device to produce a second output signal; and
said data processing controlled system responsive to said second output signal to re-initiate its operation.

5. A circuit as in claim 4 in which said data processing controlled system comprises controlled devices and further comprising logic means responsive to the absence of N consecutive output trigger pulses to disable said data processing controlled system and to place said controlled devices in predetermined operating states.

6. A method of providing fail-safe protection for a data processor controlled system should it fail comprising the steps of:
a. generating a series of periodic trigger pulses during proper operation of the system with the periods between said periodic pulses not exceeding a time interval $T_1$;
b. generating a control signal when the trigger pulses cease for a time interval $T_2$;
c. blocking the flow of data in said data processing system in response to said control signal; and
d. re-initiating operation of said data processing system in response to said control signal.

7. A method as in claim 6 comprising the further steps of:
e. disabling said data processor after an absence of N trigger pulses in response to said control signal; and
f. placing the data processor controlled system in a predetermined operating state after disablement thereof.

8. A method of providing fail-safe protection for a data processor controlled system should it fail and comprising the steps of:
a. generating a series of periodic trigger pulses during proper operation of the system with the periods between said periodic pulses not exceeding a time interval $T_1$;
b. interrupting the operation of said data processor controlled system when the trigger pulses cease for a time interval $T_2$, where $T_2 > T_1$; and
c. re-initiating operation of said data processor after a time interval $T_3$ following the time interval $T_2$.

9. A method as in claim 8 comprising the further steps of:
d. disabling said data processor controlled system after an absence of N trigger pulses for a time period $T_2$ and consequent interruption of said data processor controlled system; and
e. placing the data processor controlled system in a predetermined operating state after disablement thereof.

* * * * *